(12) United States Patent
Nordin et al.

(10) Patent No.: US 9,024,193 B2
(45) Date of Patent: *May 5, 2015

(54) COMMUNICATION CABLE WITH IMPROVED CROSSTALK ATTENUATION

(71) Applicants: Panduit Corp., Tinley Park, IL (US); General Cable Technologies Corp., Highland Heights, KY (US)

(72) Inventors: Ronald A. Nordin, Naperville, IL (US); Masud Bolouri-Saransar, Orland Park, IL (US); Royal O. Jenner, Tinley Park, IL (US); Timothy J. Houghton, II, Chicago, IL (US); Thomas G. McLaughlin, Taylor Mill, KY (US); Kenneth E. Cornelison, Cincinnati, OH (US); David P. Camp, II, Florence, KY (US)

(73) Assignee: Panduit Corp., Tinley Park, IL (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/736,227

(22) Filed: Jan. 8, 2013

(65) Prior Publication Data
US 2013/0118772 A1    May 16, 2013

Related U.S. Application Data

(63) Continuation of application No. 12/613,695, filed on Nov. 6, 2009, now Pat. No. 8,354,590.

(60) Provisional application No. 61/112,794, filed on Nov. 10, 2008.

(51) Int. Cl.
| | | |
|---|---|---|
| *H01B 7/00* | (2006.01) |
| *H01B 11/04* | (2006.01) |
| *B32B 7/12* | (2006.01) |
| *B32B 15/08* | (2006.01) |
| *H01B 11/10* | (2006.01) |
| *H01B 7/18* | (2006.01) |

(52) U.S. Cl.
CPC ........ *H01B 11/04* (2013.01); *B32B 7/12* (2013.01); *B32B 15/08* (2013.01); *H01B 11/1008* (2013.01); *H01B 7/1845* (2013.01)

(58) Field of Classification Search
USPC ............................ 174/36, 110 R, 113 R, 112
See application file for complete search history.

(56) References Cited

U.S. PATENT DOCUMENTS

| | | |
|---|---|---|
| 3,090,825 A | 5/1963 | Volk |
| 3,312,774 A | 4/1967 | Peterson |
| 3,794,750 A | 2/1974 | Garshick |
| 4,236,779 A | 12/1980 | Tang |
| 4,684,437 A | 8/1987 | Donelon et al. |
| 5,132,488 A | 7/1992 | Tessier et al. |

(Continued)

FOREIGN PATENT DOCUMENTS

| | | |
|---|---|---|
| GB | 2432963 A | 6/2007 |
| JP | 6317192 S | 9/1988 |

(Continued)

*Primary Examiner* — William H Mayo, III
(74) *Attorney, Agent, or Firm* — Christopher S. Clancy; Christopher K. Marlow

(57) ABSTRACT

A matrix tape with conductive segments. The conductive segments are preferably provided on two layers of the matrix tape. The conductive segments can be attached to a film with an adhesive. A barrier tape is preferably applied between the cable core and the matrix tape.

9 Claims, 6 Drawing Sheets

(56) References Cited

U.S. PATENT DOCUMENTS

| | | |
|---|---|---|
| 5,473,336 A | 12/1995 | Harman et al. |
| 5,969,295 A | 10/1999 | Boucino et al. |
| 6,624,359 B2 | 9/2003 | Bahlmann et al. |
| 6,639,152 B2 | 10/2003 | Glew et al. |
| 6,818,832 B2 | 11/2004 | Hopkinson et al. |
| 7,332,676 B2 | 2/2008 | Sparrowhawk |
| 7,335,837 B2 | 2/2008 | Pfeiler et al. |
| 7,834,271 B2 | 11/2010 | Gromko et al. |
| 7,923,641 B2 | 4/2011 | Smith et al. |
| 2004/0055781 A1 | 3/2004 | Cornibert et al. |
| 2006/0048961 A1 | 3/2006 | Pfeiler et al. |
| 2006/0169478 A1 | 8/2006 | Clark |
| 2007/0037419 A1 | 2/2007 | Sparrowhawk |
| 2009/0223694 A1 | 9/2009 | Nordin et al. |
| 2009/0294146 A1 | 12/2009 | Nordin et al. |

FOREIGN PATENT DOCUMENTS

| | | |
|---|---|---|
| JP | 04043509 H | 2/1992 |
| JP | 2006073534 A | 3/2006 |
| TW | 266337 B | 12/1995 |
| WO | 2006105166 A2 | 10/2006 |

COMMUNICATION CABLE WITH IMPROVED CROSSTALK ATTENUATION

CROSS-REFERENCE TO RELATED APPLICATIONS

This application is a continuation of U.S. patent application Ser. No. 12/613,695, filed Nov. 6, 2009, which claims the benefit of U.S. Patent Application No. 61/112,794, filed Nov. 10, 2008, which are incorporated herein by reference in their entirety.

FIELD OF THE INVENTION

The present invention is related generally to telecommunications cables and more specifically to telecommunications cables designed to reduce crosstalk between adjacent cables.

BACKGROUND OF THE INVENTION

As networks become more complex and have a need for higher bandwidth cabling, attenuation of cable-to-cable crosstalk (or "alien crosstalk") becomes increasingly important to provide a robust and reliable communication system. Alien crosstalk is primarily coupled electromagnetic noise that can occur in a disturbed cable arising from signal-carrying cables that run near the disturbed cable, and is typically characterized as alien near end crosstalk (ANEXT), or alien far end crosstalk (AFEXT). Additionally, crosstalk can occur between twisted pairs within a particular cable, which can additionally degrade a communication system's reliability, and is typically characterized as near end crosstalk (NEXT), or far end crosstalk (FEXT).

One way of reducing alien crosstalk in a communication channel is to provide a shielded cable (foiled twisted pair (F/UTP) for example) terminated in shielded connectors. However, this solution has a much higher cost when compared to an unshielded twisted pair (U/UTP) system due to the higher cost of the cable and connectors, and higher labor costs associated with terminating the shielded cable with shielded connectors, and other installation factors. Additionally, this type of cable can potentially increase NEXT and FEXT between pairs within a cable. Screened and foiled twisted pair (S/FTP) cable (screened shield around all of the pairs, and then individual foil shields around each individual pair) reduces ANEXT and AFEXT, and also reduces NEXT and FEXT when compared to F/UTP, but has even higher material and labor costs when compared to F/UTP.

Alien crosstalk can also be reduced by adding a spacer between the conductors and the cable jacket, to increase the average distance between the conductors in adjacent cables, and thereby reduce alien crosstalk. However, this solution increases the overall diameter of the cable which has practical disadvantages in that such a cable typically has a larger minimum bend radius and also, with the relatively large diameter, fewer cables can be placed in a given conduit or cable tray.

Another option for reducing alien crosstalk is that an STP cable can be used with the shield unterminated. Unfortunately, such a cable can have problems with respect to electromagnetic compatibility (EMC) requirements, both radiation and susceptibility, which can lead to alien crosstalk particularly when there is imbalance present in the cable.

SUMMARY OF THE INVENTION

The present invention primarily relates to a U/UTP cable employing a matrix tape to improve crosstalk attenuation.

Figure 1:
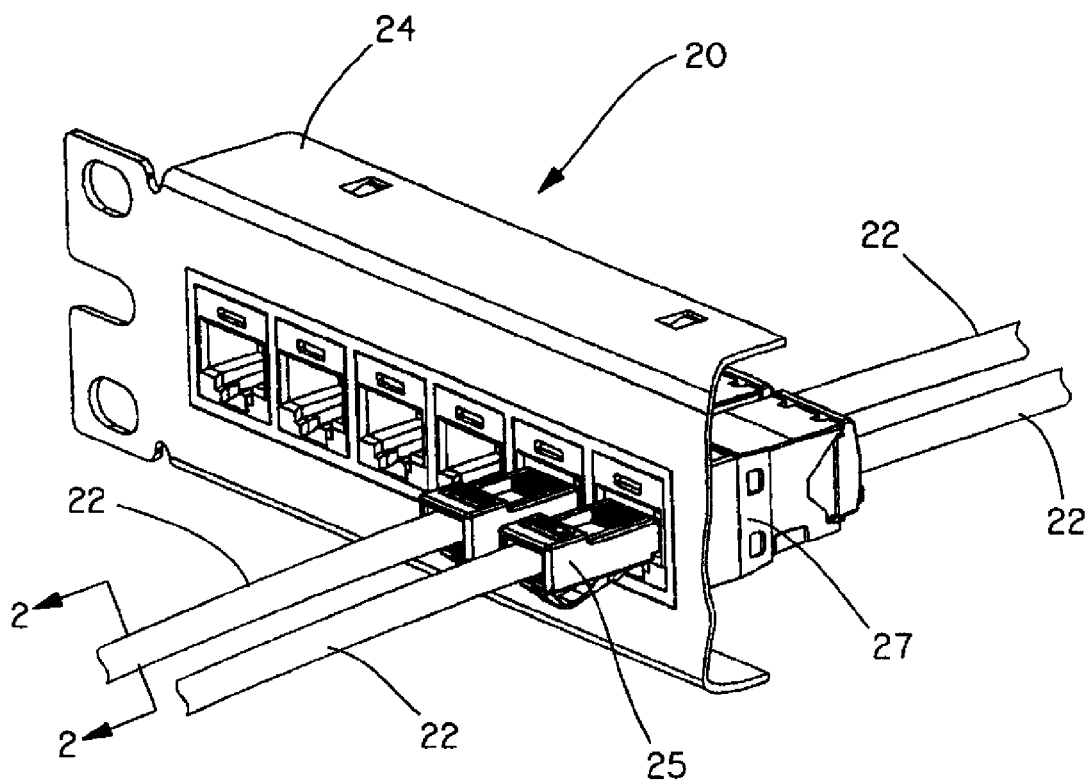
FIG. 1 is an illustration of a communication system according to one embodiment of the present invention.

Referring now to the drawings, and more particularly to FIG. 1, there is shown a communication system 20, which includes at least one communication cable 22, connected to equipment 24. Equipment 24 is illustrated as a patch panel in FIG. 1, but the equipment can be passive equipment or active equipment. Examples of passive equipment can be, but are not limited to, modular patch panels, punch-down patch panels, coupler patch panels, wall jacks, etc. Examples of active equipment can be, but are not limited to, Ethernet switches, routers, servers, physical layer management systems, and power-over-Ethernet equipment as can be found in data centers/telecommunications rooms; security devices (cameras and other sensors, etc.) and door access equipment; and telephones, computers, fax machines, printers and other peripherals as can be found in workstation areas. Communication system 20 can further include cabinets, racks, cable management and overhead routing systems, and other such equipment.

Communication cable 22 is shown in the form of an unshielded twisted pair (UTP) cable, and more particularly a Category 6A cable which can operate at 10 Gb/s, as is shown more particularly in FIG. 2, and which is described in more detail below. However, the present invention can be applied to and/or implemented in a variety of communications cables, as well as other types of cables. Cables 22 can be terminated directly into equipment 24, or alternatively, can be terminated in a variety of plugs 25 or jack modules 27 such as RJ45 type, jack module cassettes, and many other connector types, or combinations thereof. Further, cables 22 can be processed into looms, or bundles, of cables, and additionally can be processed into preterminated looms.

Communication cable 22 can be used in a variety of structured cabling applications including patch cords, backbone cabling, and horizontal cabling, although the present invention is not limited to such applications. In general, the present invention can be used in military, industrial, telecommunications, computer, data communications, and other cabling applications.

Figure 2:
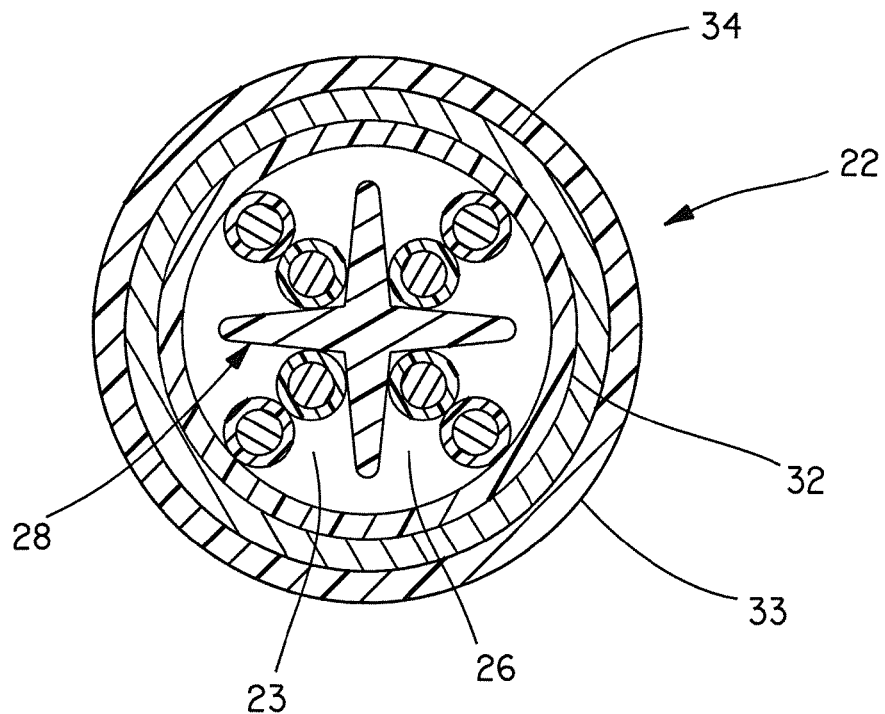
FIG. 2 is a cross-sectional view of a cable according to one embodiment of the present invention.
Figure 3:
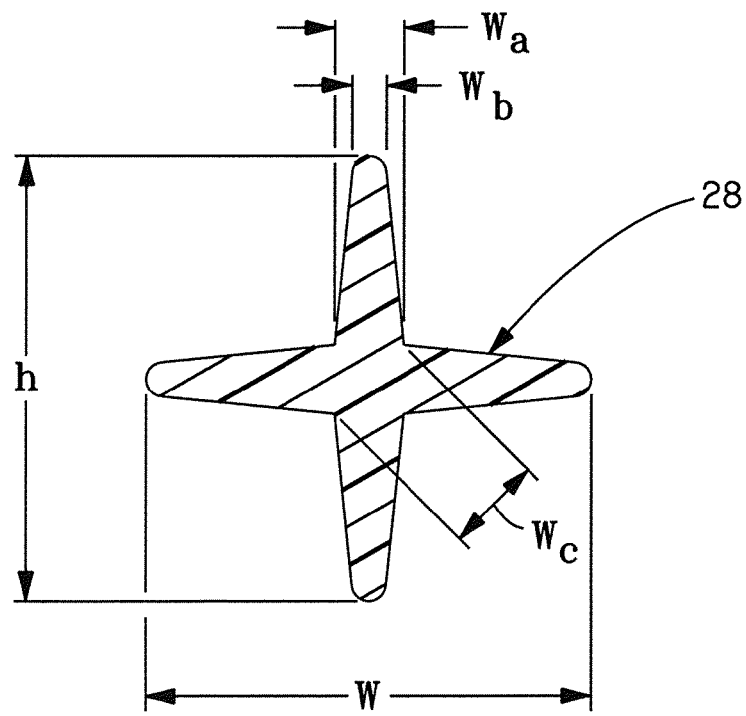
FIG. 3 is a cross-sectional view of a pair separator according to one embodiment of the present invention.

Referring more particularly to FIG. 2, there is shown a transverse cross-section of cable 22, taken along section line 2-2 in FIG. 1. Cable 22 includes an inner core 23 with four twisted conductive wire pairs 26 that are separated with a pair separator 28. A cross-section of pair separator 28 is shown in more detail in FIG. 3, which shows dimensions of one embodiment of the pair separator first in inches and second (in brackets) in millimeters. In a preferred embodiment, pair separator 28 is produced with a clockwise rotation (left hand lay) with a cable stranding or lay length of 3.2 inches. Pair separator 28 can be made of a plastic, such as a solid fire retardant polyethylene (FRPE), for example.

Figure 4:
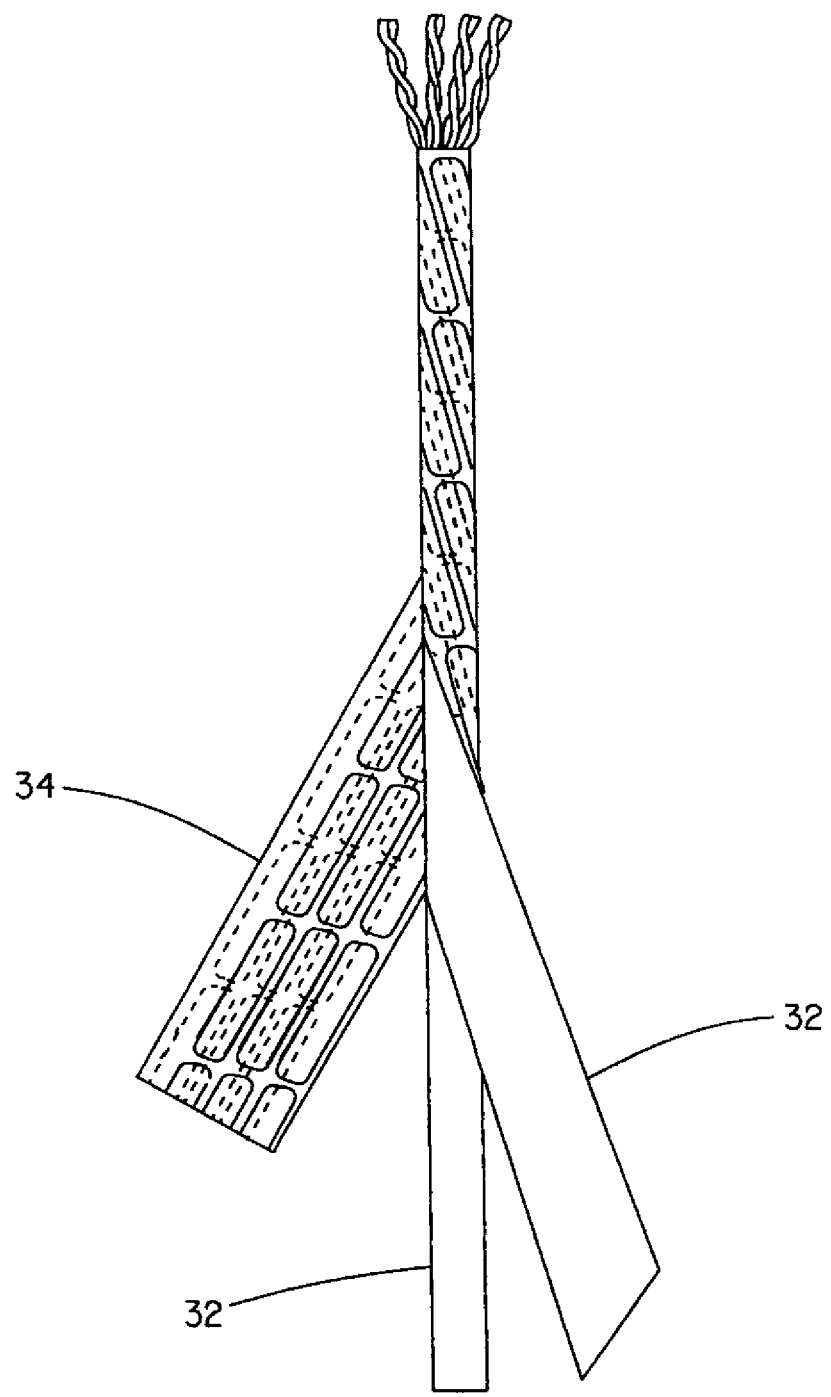
FIG. 4 is a view showing the application of barrier tape in a cable according to one embodiment of the present invention.

A wrapping of barrier tape 32 surrounds inner core 23. Barrier tape 32 can be helically wound around inner core 23 as shown in FIG. 4, with an approximate 15°±10° angle of wrap. In a preferred embodiment barrier tape 32 can be a polypropylene foam, for example, with a 1.5 inch width and a 0.005 inch thickness. As shown in FIG. 2, the twisted pair conductors extend beyond pair separator 28 to create an outer diameter of inner core 23 of approximately 0.2164 inches, which has a circumference of 0.679 inches. The barrier tape 32 therefore wraps around inner core 23 slightly more than twice, and there are two applications of barrier tape 32 (as shown in FIG. 4) which gives a total approximate thickness for barrier tape 32 of 0.020 inches (however, other thicknesses are possible such as 0.005 to 0.0030 inches).

The conductor wire is nominally 23 AWG solid copper (nominally 0.0226 inch diameter), and more specifically has a 0.0238±0.0005 inch diameter. There are slight variations in insulator thickness for the wire pairs which produce slight variations in impedance from pair to pair. The insulator thickness is as follows: Pair 1 (blue/white-blue)=0.0455±0.0005 inch thick; Pair 2 (orange/white-orange)=0.0439±0.0005 inch thick; Pair 3 (green/white-green)=0.0452±0.0005 inch thick; and Pair 4 (brown/white-brown)=0.0446±0.0005 inch thick. The conductor insulation can be a fire retardant polyethylene, for example. In a preferred embodiment, the pair lays are as follows: Pair 1 (blue/white-blue)=0.328 inch; Pair 2 (orange/white-orange)=0.464 inch; Pair 3 (green/white-green)=0.353 inch; and Pair 4 (brown/white-brown)=0.423 inch.

Figure 5:
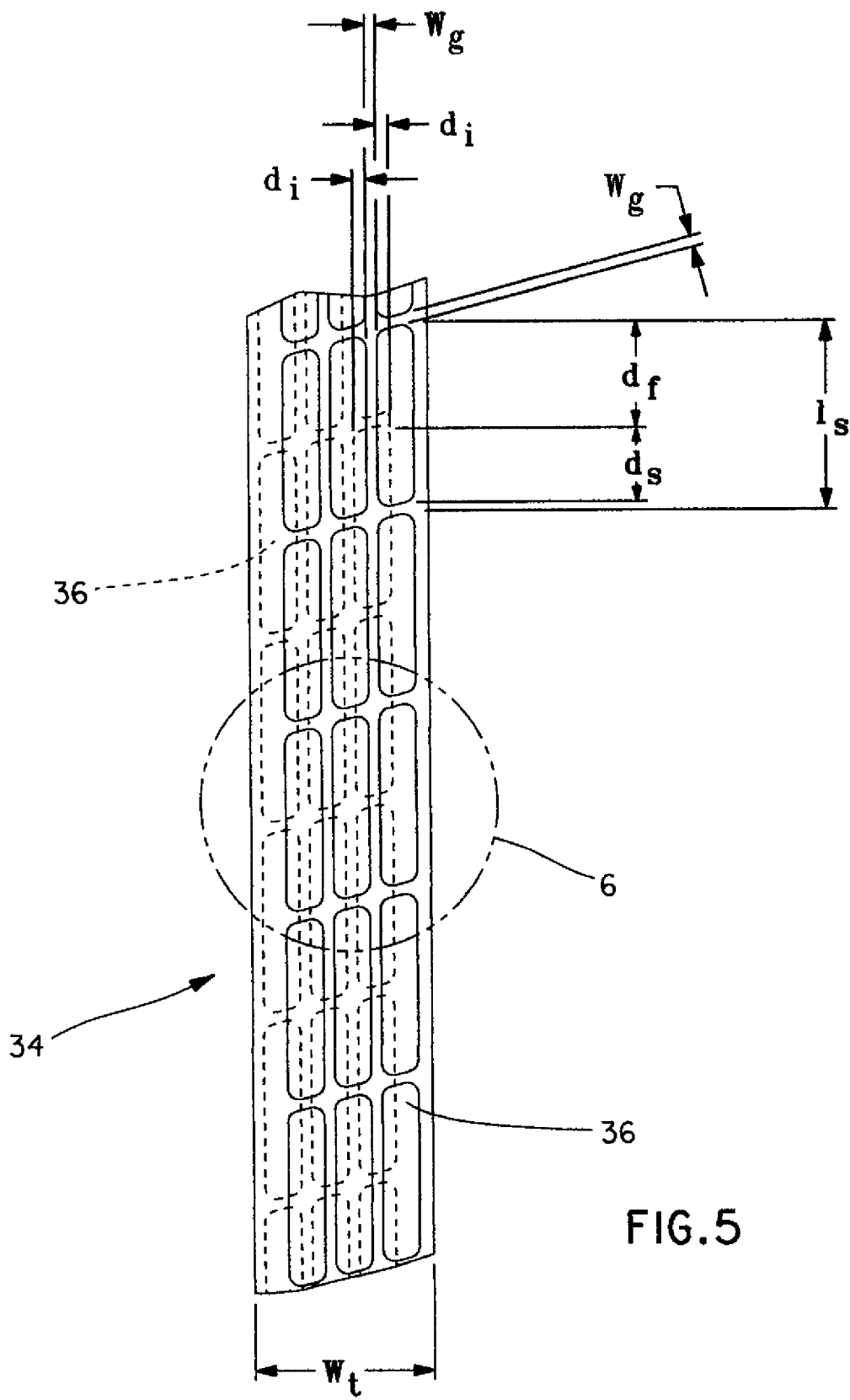
FIG. 5 is a plan view of a matrix tape according to one embodiment of the present invention.
Figure 6:
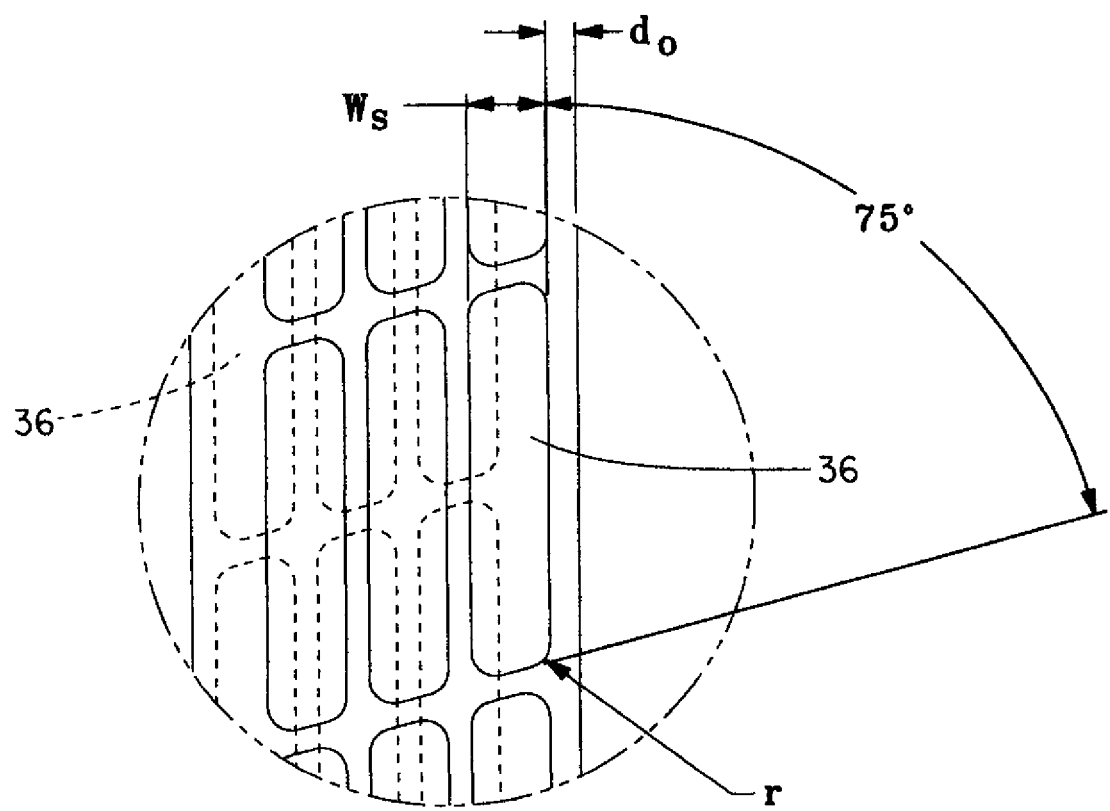
FIG. 6 is a detail view of the detail "A" of FIG. 5.
Figure 7:
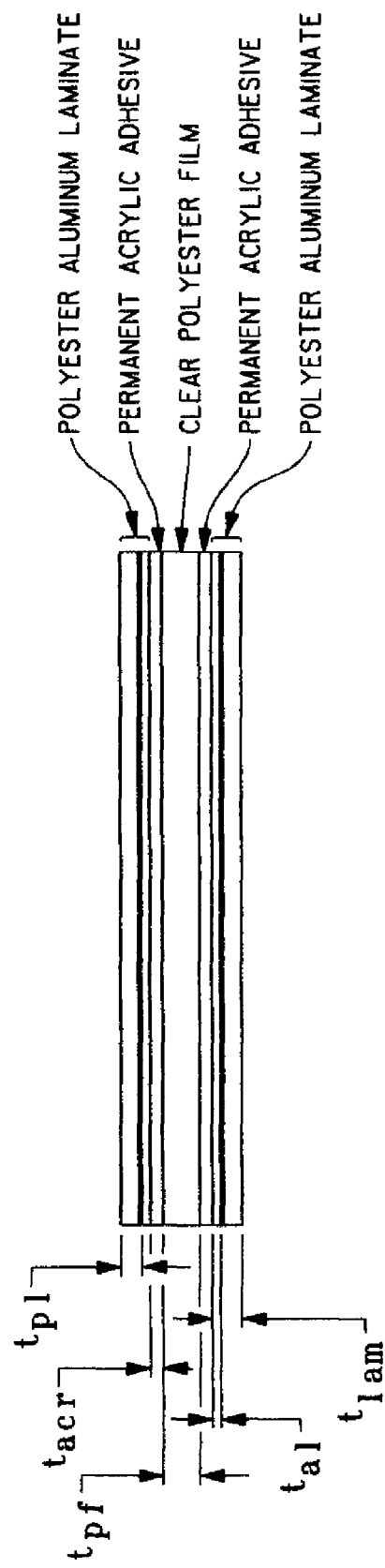
FIG. 7 is a cross-sectional view of a matrix tape according to one embodiment of the present invention.

Matrix tape 34 (see particularly FIGS. 5-7) is helically wrapped around barrier tape 32, as is shown in FIGS. 2 and 4, with an approximately 15° angle of wrap, and approximately 25% overlap, for example. According to one embodiment, matrix tape 34 is "kiss" die cut to produce conductive segments 36 on either side of tape 34. FIG. 7 illustrates a cross-section of matrix tape 34 in a section of the tape where there are conductive segments 36 on either side; or in other words, a cross-section of matrix tape 34 prior to the kiss die cutting. The material remaining between conductive segments 36 after kiss die cutting is the center polyester film substrate, and perhaps some adhesive residue. The box at the top of FIG. 7 shows the overall thickness of a polyester-aluminum laminate, along with the thicknesses of the polyester and aluminum layers that make up the laminate. Also included in the laminate, though not shown in the chart, is a thin layer of adhesive, having a thickness of about 0.0001". FIGS. 5, 6 and 7 show dimensions for one embodiment of a matrix tape according to the present invention, first in inches and second (in brackets) in millimeters. Dimensions marked "T.S.C. Typ" reflect the theoretical dimensions if the corners were sharp instead of rounded. FIG. 6 is a detail view of detail "A" of FIG. 5. The "radius" ("R") of the rounded corners is given in FIG. 6.

Cable 22 also can include an outer insulating jacket 38. Outer insulating jacket 33, can be made of flame retardant polyvinyl chloride (FRPVC), and can be 0.015 inch thick (however, other thicknesses are possible). The overall diameter of cable 22 can be nominally 0.302 inch, for example; however, other thicknesses are possible.

The invention claimed is:

1. A communication cable, comprising:
   a plurality of twisted pairs of conductors;
   a matrix tape substantially surrounding the plurality of twisted pairs of conductors, the matrix tape including a layer of conductive segments separated by gaps in both a longitudinal and a circumferential direction of the cable such as to prevent any individual segment from traversing an entire length or entire circumference of the communication cable;
   a barrier tape between the plurality of twisted pairs of conductors and the matrix tape; and
   a pair separator separating at least one of the plurality of twisted pairs of conductors from another of the plurality of twisted pairs of conductors.

2. The communication cable of claim 1 wherein the barrier tape is helically wound around the plurality of twisted pairs of conductors.

3. The communication cable of claim 1 wherein the conductive segments are approximately parallelogram-shaped.

4. The communication cable of claim 3 wherein the conductive segments have rounded corners.

5. A communication cable, comprising:
   a plurality of twisted pairs of conductors;
   a matrix tape helically wrapped around the plurality of twisted pairs of conductors, the matrix tape including an insulating layer and a layer of conductive segments separated by gaps in both a longitudinal and a circumferential direction of the cable such as to prevent any individual segment from traversing an entire length or entire circumference of the communication cable; and
   a pair separator separating at least one of the plurality of twisted pairs of conductors from another of the plurality of twisted pairs of conductors.

6. The communication cable of claim 5 wherein the matrix tape is helically wrapped at an angle of approximately 15 degrees.

7. The communication cable of claim 5 wherein the matrix tape is helically wrapped with a 25 percent overlap.

8. The communication cable of claim 5 wherein the conductive segments are approximately parallelogram-shaped.

9. The communication cable of claim 8 wherein the conductive segments have rounded corners.

* * * * *